United States Patent Office 2,810,728
Patented Oct. 22, 1957

2,810,728

BETA-SULPHONYL KETONES

Stanley Beesley, John Alec John, and James Gordon Napier Drewitt, Spondon, near Derby, England, assignors to British Celanese Limited, a corporation of Great Britain No Drawing. Application October 10, 1952,
Serial No. 314,224

Claims priority, application Great Britain
October 25, 1951

4 Claims. (Cl. 260—332.1)

This invention relates to plasticizing and solvent derivatives and especially to plasticisers, softening agents and solvents for cellulose acetate and other cellulose derivatives.

We have found that a valuable series of plasticisers and solvents for cellulose derivatives such as cellulose acetate is afforded by certain substitution derivatives of sulpholane:

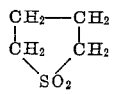

notably: ketones such as sulpholanyl acetone, esters such as sulpholanyl butyrate, ethers such as sulpholanyl-sec.-butyl ether, and nitro-compounds such as sulpholanyl nitro-methane.

The plasticisers and solvents of the invention are all β-substitution derivatives of sulpholane, wherein the substituent is a group containing carbon, hydrogen and oxygen in which every hydrogen atom is attached to carbon and no oxygen atom is attached to atoms of two different elements, said group being free from olefinic unsaturation and from any chain containing as many as six consecutive carbon atoms. The oxygen in the substituent group may be present, for example in the form of an ether group, a ketonic group, an ester group (in which the sulpholane residue forms part either of the acid radical or of the alcoholic radical) or a nitro-group. Those substituents are preferred in which, in addition to the foregoing requirements, all the oxygen present is in the form of atoms doubly linked to multivalent atoms as in keto- or nitro-groups. In derivatives in which the substituent contains chains of as many as six consecutive carbon atoms attached only to carbon and hydrogen, the affinity of the substitution product for cellulose acetate and like esters is unduly low and such products are not included within the scope of the present invention. Preferably the substituent is free from chains containing more than four consecutive carbon atoms and from aromatic groups. The best results have been obtained when the substituent contains three or four carbon atoms.

The derivatives of the invention provide a series of plasticisers having affinity (as shown by solvent power) for cellulose acetates of a range of combined acetic acid content extending from 52% to 56% or even higher, e. g. up to 62.5%. Particularly valuable in this respect are β-mono-substitution derivatives of sulpholane in which the substituent is a group containing only carbon, hydrogen and oxygen, said group containing three or four carbon atoms. The invention provides a series of plasticisers that dissolve cellulose triacetate at temperatures well below their decomposition temperatures. Very few if any plasticisers having this property have hitherto been found. The invention includes the new plasticisers, softening agents and solvents, their manufacture and use in plasticising, softening or dissolving cellulose acetate containing at least 52% (and preferably above 56%) of combined acetic acid, and compositions containing them.

The preferred sulpholane derivatives of the invention are those containing ketonic groups, and especially acyimethylene 3-sulpholanes. Suitable derivatives of this kind can be made by direct condensation under alkaline conditions of 3-sulpholene:

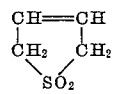

(obtainable by condensation of butadiene with sulphurdioxide) with the appropriate ketone. In this way ketonic derivatives of sulpholane have been obtained which, compared with sulpholanyl esters of approximately the same molecular weight, are of higher heat-stability, lower volatility, and higher melting point (so that they have little tendency to migrate from compositions in which they are present). The following example (in which, as throughout the specification, all the parts are by weight) illustrates the preparation of sulpholanyl acetone:

*Example I*

Into a stirred autoclave a reaction mixture of the following composition was introduced:

20 parts of sulpholene
40 parts of acetone
5 parts of a 30% aqueous solution of ethyl trimethyl-ammonium-hydroxide.

The mixture was stirred at 25° for 2 hours. It was then acidified with 20% aqueous sulphuric acid and distilled free of water and acetone. Distillation was continued under a pressure of 10 mm. and the product distilling over at 140–170° C. was collected. This crystallised on cooling to a light brown solid of melting point approximately 42° C.

Films were cast from acetone solutions of cellulose acetate unplasticised and with various proportions of the sulpholanyl acetone as plasticiser. The following table gives the results of tensile tests on a typical series of films prepared in this way:

| Sulpholanyl Acetone, percent by weight | Tenacity, Kgs./sq. cm. | Extension, Percent |
|---|---|---|
| None | 539 | 15.5 |
| 10 | 572 | 23.5 |
| 20 | 372 | 25.3 |
| 30 | 266 | 30 |

In a similar way sulpholanyl derivatives of other ketones containing replaceable hydrogen atoms in the α-position, and especially ketones containing an α-methyl group, can be made. Among such derivatives are those of: methyl ethyl ketone, methyl propyl ketone, methyl isopropyl ketone, methyl n-butyl ketone and methyl isobutyl ketone. Ketones in which both alkyl groups contain more than one carbon atom but which contain replaceable hydrogen attached to the α-carbon atom, for example diethyl ketone, and ketones containing a benzene ring and an alkyl radical containing replaceable hydrogen attached to the α-carbon atom, for example acetophenone, can be condensed with sulpholene in a similar manner to form derivatives having some affinity for cellulose derivatives.

Nitro-paraffins, e. g. nitro-methane, containing replaceable hydrogen attached to the α-carbon atom can also be condensed with sulpholene to produce sulpholanyl derivatives having the desired plasticising or solvent properties.

By condensation reactions similar to those described above, in which the ketone is replaced by diethyl malonate or ethyl cyano-acetate, followed by hydrolysis of the resulting di-ester or cyano-ester, sulpholanyl acetic acid can be prepared, from which a series of esters having the desired solvent and plasticising properties can be obtained by esterification for instance with methanol, ethanol, n-propanol, isopropanol and other alcohols of low or medium molecular weight, or with phenol.

Esters, in which the sulpholanyl group forms part of the alcohol radical, can be obtained by esterifying 3-sulpholanol, obtainable by hydration of sulpholene, with fatty acids such, for example, as acetic, propionic, butyric, n-valeric, caproic and 2-ethyl-hexoic acids. The following example illustrates the preparation of 3-sulpholanyl n-butyrate.

Example II

Sulpholene was hydrated with 2 N caustic potash for 20 hours at 20–30° C. The solution was neutralised with concentrated hydrochloric acid and then evaporated to dryness. The residue was extracted with boiling acetone and the acetone was then distilled off. The product was maintained at 150° C. for 2 hours to decompose any unchanged sulpholene. The crude 3-sulpholanol was then distilled under reduced pressure and the fraction distilling over at 180–185° C. under 1 mm. was collected and found to melt at 58° C.

The following reaction mixture was run into the base of a still:

100 parts of 3-sulpholanol
87 parts of n-butyric anhydride
24 parts of benzene and
1.0 part of p-toluene sulphonic acid and heated to effect esterification of the sulpholanol. Benzene and butyric acid were distilled off at 50 mm. pressure. Distillation was then continued at 4.5 mm. pressure and the fraction boiling at 162–171° C. was collected.

The sulpholanyl butyrate was found to dissolve cellulose acetates of combined acetic acid content from 52 to 62.5%. The solution temperature for the triacetate (62.5% acetic acid) was approximately 160° C.

Films were cast as described in Example I from cellulose acetate unplasticised and with various proportions of the sulpholanyl 2-ethyl-hexoate. Tensile tests on the resulting films showed an increase in extension and flexibility, showing the value of the sulpholanyl butyrate as a plasticiser.

Similarly 3-sulpholanyl acetate was made using 56 parts of acetic anhydride instead of the 87 parts of n-butyric anhydride and collecting the fraction boiling at 150 to 160° C. under 4 mm. pressure. This was found also to dissolve cellulose acetates of the range of acetic acid content specified above, the solution temperature for cellulose triacetate being about 150° C. Other esters containing chains of up to five consecutive carbon atoms, that can be made in the same way, and that have good solvent power for cellulose triacetate include the corresponding propionic and isobutyric esters.

Some esters containing chains of more than six consecutive carbon atoms were made for comparison but it was found that their solvent power for cellulose acetate was much less. Thus, for example, the 2-ethyl hexoate did not dissolve triacetate completely even at 190° C. at which temperature there was some decomposition. The corresponding laurate showed even lower solvent power.

The following example illustrates the production of sulpholanyl benzoate:

Example III

A reaction mixture consisting of 10 parts of sulpholanol, 24 parts of benzoyl chloride and 234 parts of 15% caustic soda solution was shaken for 30 minutes at room temperature. The sulpholanyl benzoate was filtered off and recrystallised from aqueous ethanol. Its melting point was 157° C.

Films made from an acetone solution of cellulose acetate containing 10% of sulpholanyl benzoate contained patches of crystalline benzoate showing the compatibility of the benzoate with cellulose acetate to be considerably lower than that of the n-butyrate. Such aromatic esters are not, in consequence, suitable for use as the sole plasticiser with cellulose acetate. They can be used, however, as softening plasticisers in conjunction with a plasticiser of lower melting point and higher affinity for cellulose acetate, for example dimethyl phthalate, diethyl phthalate, tri-(monochloroethyl) phosphate, methyl-phthalyl-ethyl-glycolate or ethyl-phthalyl-ethyl-glycolate.

Sulpholanyl ethers can be obtained by etherifying 3-sulpholanol, e. g. with methanol, ethanol, n-propanol and other alcohols of low to medium molecular weight or with the mono-alkyl ethers of ethylene glycol and polyethylene glycols, for example the mono-methyl and mono-ethyl ethers of ethylene glycol or diethylene glycol. Multiplication of ether groups in the substituent in general increases the solvent power for cellulose acetate but at the expense of water resistance.

The following example illustrates the preparation of methoxyethyl 3-sulpholanyl ether:

Example IV

The reaction mixture was of the following composition:

23.6 parts of recrystallised 3-sulpholene
76 parts of the monomethyl ether of ethylene glycol
5 parts of powdered potassium hydroxide.

This mixture was stirred and allowed to stand for 24 hours. The solution was neutralised with 20% (by weight) sulphuric acid and the precipitate (potassium sulphate) was filtered off.

Excess of the glycol ether was distilled off at atmospheric pressure. Distillation was then continued under 2 mm. pressure and the fraction boiling at 160–175° C. was collected.

The methoxyethyl 3-sulpholanyl ether so obtained was found to plasticise cellulose acetate of combined acetic acid content 52 to 62.5 giving clear films.

The following example illustrates the preparation of secondary butyl 3-sulpholanyl ether:

Example V

The process was carried out as described in Example IV substituting 74 parts of secondary butanol for the glycol ether and collecting the fraction boiling at 140–146° C. under 4 mm. pressure.

The product was a colourless liquid which plasticised cellulose acetates of 52 to 62.5% combined acetic acid giving clear films and dissolved the triacetate at 155° C.

Similarly other aliphatic ethers containing chains of up to five consecutive carbon atoms can be obtained. Such ethers include the methyl-, ethyl-, propyl butyl-, ethoxyethyl-, propoxyethyl- and isopropoxyethyl-mono-ethers of 3-sulpholanol.

The following example illustrates the preparation of phenyl 3-sulpholanyl ether:

Example VI

Powdered potassium hydroxide 5 parts and phenol 70 parts were stirred at 50° C. for one hour, after which 23.6 parts of 3-sulpholene were stirred in and the stirring continued for two hours. The reaction mixture was allowed to stand for 24 hours. It was then filtered and excess of potassium hydroxide was added. The mixture was then extracted with benzene at 70° C. From the extract benzene was removed by distillation at atmospheric pressure, distillation was continued at 4 mm. pressure and the fraction boiling at 69–74° C. was collected. The product, a pale yellow viscous liquid has insufficient solvent power for cellulose acetate to be used as the sole plasticiser therefor but can be used in conjunction with a plasticiser of higher solvent power therefor.

Other aromatic ethers can be made in same way. The derivatives so far described have been derived from sulpholane by substitution of a hydrogen atom of one only of the β-carbon atoms. The invention includes, however, derivatives substituted at both the 3 and 4 carbon atoms with substituents of the kind referred to above. Thus, for example, di-esters and di-ethers of 3,4-dihydroxy sulpholane having valuable plasticising and solvent properties for cellulose acetate may be obtained. Thus, for example, the invention includes derivatives of 3,4-dihydroxy sulpholane in which one of the hydroxy groups is esterified and the other etherified, and derivatives in which the two hydroxy groups are esterified by the same or different acids or etherified by the same or different alcohols. The invention also includes derivatives of sulpholane in which one of the β-carbon atoms is substituted by a group of the kind referred to above especially an ether, ester, keto- or nitro-paraffin group and the other is substituted by another element or group.

By way of comparison various halogen substituted derivatives of sulpholane were made but were found insufficiently stable for general use. Thus, for example, 3-chlor-sulphonalyl 4-butyrate was found to decompose on distillation even under low pressure, and 3,4-dichlor-3-methyl sulpholane (made by chlorinating 3-methyl sulpholane in solution in ethyl dichloride) although it dissolved triacetate at 155° C. underwent discolouration at the temperature.

The plasticisers of the invention are of special value in making films (including foils) of high tenacity and low extension. These plasticisers may also be used in making other kinds of cellulose acetate product, for example in making sheets by the block process, in making moulding compositions, and in formulating cellulose acetate lacquers for use as protective coatings. The introduction of the plasticiser into the cellulose acetate composition can be carried out by various methods. Thus, for example, in making a moulding or extrusion composition the plasticiser and cellulose acetate may be mixed with a volatile solvent for both, to form a solution from which the volatile solvent is then evaporated, or the plasticiser and cellulose acetate may be dissolved in a hot liquid which is not a solvent at ordinary temperature, for example ethanol, the solution being then cooled until precipitation occurs, after which the volatile liquid is evaporated, or hot mixing or milling methods, avoiding the use of volatile liquids, may be adopted.

The proportion of a sulpholane derivative that may be present in a cellulose acetate composition may range from below 30%, for example 20%, to over 50%, for example 60–80%, these percentages being based on the weight of the cellulose acetate. Other plasticisers may also be present. Thus, for example, should a higher degree of softness than is imparted by the sulpholane derivative be desired, it may be used in admixture with a mobile plasticiser of high solvent power such, for example, as dimethyl phthalate or triacetin, and when improved fire-resistance is called for a proportion of a phosphate plasticiser, for example triphenyl phosphate, tricresyl phosphate or trichlorethyl phosphate, may be incorporated.

The invention has been described with particular reference to the use of the sulpholane derivatives as plasticisers or solvents for cellulose acetate. They can also be used, however, as solvents, softeners or plasticisers for other cellulose derivatives, e. g. cellulose nitrate, cellulose ethers such as ethyl cellulose and benzyl cellulose, and especially other cellulose esters derived from fatty acids containing up to 4 carbon atoms, for example, cellulose propionate, cellulose acetate propionate, cellulose acetate butyrate and cellulose butyrate. They can also be used in conjunction with non-cellulosic polymers of similar solubility properties to any of the cellulose derivatives specified, e. g. with polyvinyl acetate, and acetone-soluble and other acetone-soluble polymers, e. g. polymethyl methacrylate, polyethyl acrylate and acetone-soluble copolymers of vinyl chloride, vinylidine chloride, acrylonitrile, methacrylonitrile, vinyl acetate or isopropenyl acetate.

Having described our invention, what we desire to secure by Letters Patent is:

1. A β-monosubstitution derivative of sulpholane wherein the substituent group is an alkyl-carbonyl-methylene group containing 3 to 6 carbon atoms.

2. The substance 3-sulpholanyl acetone.

3. Process for making a hydrocarbon-carbonyl-methylene derivative of sulpholane which comprises reacting 3-sulpholene in the liquid phase with a ketone containing, attached directly to the carbon atom of the carbonyl group, both a methyl group and a group of the class consisting of alkyl and phenyl, under alkaline conditions.

4. Process for making 3-sulpholanyl acetone which comprises reacting 3-sulpholene in the liquid phase with acetone under alkaline conditions.

References Cited in the file of this patent

UNITED STATES PATENTS

| 2,219,006 | Delfs | Oct. 22, 1940 |
| 2,373,329 | Morris et al. | Apr. 10, 1945 |
| 2,393,925 | Morris et al. | Jan. 29, 1946 |
| 2,394,251 | Morris et al. | Feb. 5, 1946 |
| 2,451,299 | Morris et al. | Feb. 12, 1948 |
| 2,461,341 | Morris et al. | Feb. 8, 1949 |
| 2,471,272 | Hooker | May 24, 1949 |
| 2,482,631 | Morris et al. | Sept. 20, 1949 |
| 2,502,934 | Elam et al. | Apr. 4, 1950 |
| 2,504,098 | Morris et al. | Apr. 18, 1950 |
| 2,504,099 | Morris et al. | Apr. 18, 1950 |
| 2,640,834 | Tewksbury | June 2, 1953 |

FOREIGN PATENTS

| 598,309 | Great Britain | Feb. 16, 1948 |